(12) United States Patent
Zhang et al.

(10) Patent No.: US 7,533,094 B2
(45) Date of Patent: May 12, 2009

(54) METHOD AND SYSTEM FOR DETERMINING SIMILARITY OF ITEMS BASED ON SIMILARITY OBJECTS AND THEIR FEATURES

(75) Inventors: Benyu Zhang, Beijing (CN); Hua-Jun Zeng, Beijing (CN); Wei-Ying Ma, Beijing (CN); Zheng Chen, Beijing (CN); Ning Liu, Beijing (CN); Jun Yan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 10/997,749

(22) Filed: Nov. 23, 2004

(65) Prior Publication Data

US 2006/0112068 A1    May 25, 2006

(51) Int. Cl.
    *G06F 17/30* (2006.01)
(52) U.S. Cl. ................. 707/6; 707/4; 707/5; 707/7
(58) Field of Classification Search ............. None
    See application file for complete search history.

(56) References Cited

U.S. PATENT DOCUMENTS

| | | | | |
|---|---|---|---|---|
| 5,488,725 A | * | 1/1996 | Turtle et al. | 707/5 |
| 5,544,049 A | * | 8/1996 | Henderson et al. | 704/7 |
| 6,038,561 A | * | 3/2000 | Snyder et al. | 707/6 |
| 6,167,397 A | * | 12/2000 | Jacobson et al. | 707/5 |
| 6,738,678 B1 | * | 5/2004 | Bharat et al. | 700/48 |
| 6,738,764 B2 | * | 5/2004 | Mao et al. | 707/5 |
| 6,917,952 B1 | * | 7/2005 | Dailey et al. | 707/203 |
| 6,970,884 B2 | * | 11/2005 | Aggarwal | 707/103 Y |
| 6,990,628 B1 | * | 1/2006 | Palmer et al. | 715/234 |
| 7,080,073 B1 | * | 7/2006 | Jiang et al. | 707/7 |
| 7,185,001 B1 | * | 2/2007 | Burdick et al. | 707/3 |
| 2003/0074369 A1 | * | 4/2003 | Schuetze et al. | 707/103 R |
| 2003/0172058 A1 | * | 9/2003 | Namba | 707/3 |
| 2003/0172066 A1 | * | 9/2003 | Cooper et al. | 707/7 |
| 2004/0059736 A1 | * | 3/2004 | Willse et al. | 707/100 |
| 2004/0068396 A1 | * | 4/2004 | Kawatani | 703/2 |
| 2004/0128288 A1 | * | 7/2004 | Cancedda | 707/4 |

(Continued)

OTHER PUBLICATIONS

Ando, Rie Kubota, "Latent Semantic Space: Iterative Scaling Improves Precision of Inter-document Similarity Measurement," SIGIR 2000, 8 pages.

(Continued)

*Primary Examiner*—Neveen Abel Jalil
*Assistant Examiner*—Bai D Vu
(74) *Attorney, Agent, or Firm*—Perkins Coie LLP (57) ABSTRACT

A method and system for determining similarity between items is provided. To calculate similarity scores for pairs of items, the similarity system initializes a similarity score for each pair of objects and each pair of features. The similarity system then iteratively calculates the similarity scores for each pair of objects based on the similar scores of the pairs of features calculated during a previous iteration and calculates the similarity scores for each pair of features based on the similarity scores of the pairs of objects calculated during a previous iteration. The similarity system implements an algorithm that is based on a recursive definition of the similarities between objects and between features. The similarity system continues the iterations of recalculating the similarity scores until the similarity scores converge on a solution.

24 Claims, 4 Drawing Sheets

U.S. PATENT DOCUMENTS

2005/0081146 A1* 4/2005 Tanaka et al. ............... 715/517
2005/0234881 A1* 10/2005 Burago et al. ................ 707/3

OTHER PUBLICATIONS

Atnafu, Solomon, Lionel Brunie and Harald Kosch, "Similarity-Based Operators and Query Optimization for Multimedia Database Systems," In Proceedings of the International Database Engineering and Application Symposium, 2001, pp. 346-355.

Baeza-Yates and Berthier Ribeiro-Neto, "Section 2.5 Classic Information Retrieval," Modern Information Retrieval, © 1999 by the ACM Press, pp. 24-34.

Deerwester, Scott et al., "Indexing by Latent Semantic Analysis," Journal of the American Society for Information Science, 41(6), 34 pages.

Dumais, Susan et al., "Inductive Learning Algorithms and Representations for Text Categorization," 7th International Conference on Information and Knowledge Management, Maryland, 1998, 8 pages.

Dumais, Susan T. et al., "Automatic Cross-Language Retrieval Using Latent Semantic Indexing," AAAI-97 Spring Symposium Series: Cross-Language Text and Speech Retrieval, Mar. 1997, Stanford University, pp. 18-24.

Kandola, Jaz et al., "Learning Semantic Similarity," In Proceedings of the Neural Information Processing Systems (NIPS), 2003, 8 pages.

Leopold, Edda and Jorg Kindermann, "Text Categorization with Support Vector Machines. How to Represent Texts in Input Space?," Machine Learning, vol. 46, 2002, © 2002 Kluwer Academic Publishers, pp. 423-444.

Sanders, Ian and Leigh-Ann Kenny, "Heuristics for placing non-orthogonal axial lines to cross the adjacencies between orthogonal rectangles," 13th Canadian Conference on Computational Geometry, 2001, pp. 1-16.

Schultz, Matthew and Thorsten Joachims, "Learning a Distance Metric from Relative Comparisons," In Proceedings of the Neural Information Processing Systems (NIPS), Whistler, B.C., 2003, 8 pages.

Tosun, Ali Saman and Hakan Ferhatosmanoglu, "Vulnerabilities in Similarity Search Based Systems," CIKM 2002, Virginia, © 2002 ACM, 8 pages.

Xing, Eric P. et al., "Distance metric learning, with application to clustering with side-information," NIPS 2003, Whistler, B.C., 8 pages.

Zelikovitz, Sarah and Haym Hirsh, "Using LSI for Text Classification in the Presence of Background Text," CIKM 2001, Atlanta, ACM Press, 6 pages.

Zhai, Chengxiang and John Lafferty, "Model-based Feedback in the Language Modeling Approach to Information Retrieval," 10th ACM CIKM 2001, Atlanta, 8 pages.

* cited by examiner

METHOD AND SYSTEM FOR DETERMINING SIMILARITY OF ITEMS BASED ON SIMILARITY OBJECTS AND THEIR FEATURES

TECHNICAL FIELD

The described technology relates generally to determining the similarity of items and particularly to determining the similarity of objects and the similarity of their features.

BACKGROUND

Many search engines allow users to search for information within a corpus of information. A corpus of information may be a collection of objects, such as documents, that have various features, such as the terms or words of a document. To search for objects of interest, a user submits to the search engine a search request (also referred to as a "query") that includes search terms. The search engine identifies those objects within its collection that may be related to those search terms. The search engine then provides the identification of those objects to the user as the search result. The quality of a search engine depends, in large part, on effectiveness of the search engine in identifying objects that are related to the search terms.

Search engines and many other computer applications, such as text categorization and document clustering tools, rely on a similarity metric to indicate the similarity between two items, such as documents. For example, a search engine may allow a user to select a document from a search result and to request to be provided with similar documents. As another example, a search engine, when conducting a search, may want to identify terms that are similar to (or synonyms of) the search terms provided by the user. When the search request includes the word "building," the search engine may want to search based on the additional terms of "structure" and "construction." When selecting a category for a document, a document categorization tool may calculate the similarity between that document and the documents in each category and select the category that has the most similar documents. When clustering documents, a document clustering tool may calculate the similarity between each pair of documents and identify clusters based on the similarities. Many of these applications calculate the similarity between objects using a cosine similarity metric. To calculate cosine similarity, each object is represented by a feature vector of features derived from the object. For example, a document may be represented by a feature vector indicating keywords that the document contains. A feature vector may have a dimension for each possible feature. For example, if there are 50 predefined keywords, then the feature vector has a dimension of 50 (although many documents may contain only a small fraction of the keywords). Cosine similarity measures the cosine of the angle in multi-dimensional space between feature vectors. The smaller the angle, the more similar the objects are assumed to be.

Cosine similarity assumes that the multi-dimensional space is orthogonal in that each of the features is assumed to be independent. In many practical applications, the features are, however, not independent and different features are interrelated. For example, when the features are keywords of documents, one keyword may have substantially the same meaning as another term (i.e., synonymy) or one term may have many different meanings depending on its context (i.e., polysemy). Thus, the multi-dimensional feature space is non-orthogonal in many instances. Because of the assumed independence of features, cosine similarity may not be an accurate reflection of similarity between documents that use different, but synonymous, terms, or between documents that use the same term, but with different meanings.

Various algorithms, such as Latent Semantic Indexing ("LSI"), have attempted to address the non-orthogonal problem by projecting the feature vectors into an orthogonal space. LSI attempts to identify the conceptual content of documents using a technique known as singular value decomposition, which results in an orthogonal space for the concepts. LSI then applies cosine similarity to the feature vectors of the identified concepts. Although LSI can produce acceptable similarity scores, LSI is computationally expensive and thus infeasible for large collections of objects.

It would be desirable to have an algorithm for measuring the similarity between objects with a high degree of accuracy, such as that of LSI, but with a low computational expense, such as that of cosine similarity.

SUMMARY

A method and system for determining similarity between items is provided. To calculate similarity scores for pairs of items, the similarity system initializes a similarity score for each pair of objects and each pair of features. The similarity system then iteratively calculates the similarity scores for each pair of objects based on the similar scores of the pairs of features calculated during a previous iteration and calculates the similarity scores for each pair of features based on the similarity scores of the pairs of objects calculated during a previous iteration. The similarity system implements an algorithm that is based on a recursive definition of the similarities between objects and between features. The similarity system continues the iterations of recalculating the similarity scores until the similarity scores converge on a solution.

DETAILED DESCRIPTION

A method and system for determining similarity between items is provided. In one embodiment, the similarity system determines the similarity of objects and their features assuming that the similarity of the features affects the similarity of the objects and the similarity of the objects affects the similarity of the features. The similarity system provides a mapping from each object to its features. For example, the similarity system may map each document to the keywords contained in that document. The similarity system may generate this mapping by checking the words of the documents. To calculate similarity scores for pairs of items, the similarity system initializes a similarity score for each pair of objects and each pair of features. For example, when the similarity scores range from 0 (i.e., maximum dissimilarity) to 1 (i.e., maximum similarity), the similarity system may set the similarity score between each object and itself and between each feature and itself to 1, which indicates maximum similarity.

The similarity system may also set the similarity score between each object and each other object and between each feature and each other feature to 0, which indicates minimum similarity or maximum dissimilarity. The similarity system then iteratively calculates the similarity scores for each pair of objects based on the similar scores of the pairs of features calculated during a previous iteration and calculates the similarity scores for each pair of features based on the similarity scores of the pairs of documents calculated during a previous iteration. Thus, the similarity system implements an algorithm that is based on a recursive definition of the similarities between documents and between features. The similarity system continues the iterations of recalculating the similarity scores until the similarity scores converge on a solution. For example, the similarity scores may converge when the root mean square of the differences between the similarity scores of one iteration to the next iteration are within a threshold difference. In this way, the similarity system determines the similarity between pairs of items (i.e., objects and features) without relying on an assumption that the feature space is orthogonal.

The similarity system, in one embodiment, may implement an algorithm that can be effectively described via operations of linear algebra. The mapping of objects to their features can be represented by a matrix B of dimensions m by n, where m is the number of features and n is the number of objects. Thus, B[i, j] indicates whether the object j has the feature i. The similarity system may represent the similarity between pairs of objects in a similarity matrix $S_o$ and the similarity between pairs of features in a similarity matrix $S_f$, where $S_o[i, j]$ indicates the similarity between object i and object j and where $S_f[i, j]$ indicates the similarity between feature i and feature j. The similarity system defines the similarity for objects and features by the following recursive equations:

$$S_o = B^T S_f B \quad (1)$$

$$S_f = B S_o B^T \quad (2)$$

The equations are recursive because Equation 1 is defined in terms of Equation 2 and vice versa. The similarity system calculates the similarity scores for the objects and features by iteratively calculating new similarity scores based on the similarity scores of the previous iterations. The iterative calculations are represented by the following equations:

$$S_o^{k+1} = \lambda_o B^T S_f^k B \quad (3)$$

$$S_f^{k+1} = \lambda_f B S_o^k B^T \quad (4)$$

where $S_o^k$ is a matrix of similarity scores for the objects for iteration k, $S_f^k$ is a matrix of similarity scores for the features for iteration k, B is a matrix of the features of the objects, $\lambda_o$ is a normalization factor for the similarity scores of the objects, and $\lambda_f$ is a normalization factor for the similarity scores of the features. In one embodiment, the similarity scores are normalized to between 0 and 1 using the normalization factors. A similarity score of 0 indicates maximum dissimilarity, and a similarity score of 1 indicates maximum similarity. After each iteration, the similarity system sets diagonals of the similarity matrices $S_o$ and $S_f$, which represent the similarity of an item to itself, to 1, the maximum similarity. The setting of the diagonals of the similarity matrices, during each iteration, can be represented by the following equations:

$$S_o^{k+1} = \lambda_o B^T S_f^k B + L_o^k \quad (5)$$

$$S_f^{k+1} = \lambda_f B S_o^k B^T + L_f^k \quad (6)$$

where $S_o^k$ is a matrix of similarity scores for the objects for iteration k, $S_f^k$ is a matrix of similarity scores for the features for iteration k, B is a matrix of the features of the objects, $\lambda_o$ is a normalization factor for the similarity scores of the objects, $\lambda_f$ is a normalization factor for the similarity scores of the features, and $L_o^k$ and $L_f^k$ are represented by the following equations:

$$L_o^k = I - \mathrm{diag}(\lambda_o B^T S_f^k B) \quad (7)$$

$$L_f^k = I - \mathrm{diag}(\lambda_f B S_o^k B^T) \quad (8)$$

The similarity system may initialize the similarity matrices according to the following equations:

$$S_o^0[i, j] = \begin{cases} 1 & \text{if } i = j \\ 0 & \text{if } i \neq j \end{cases} \quad (9)$$

$$S_f^0[i, j] = \begin{cases} 1 & \text{if } i = j \\ 0 & \text{if } i \neq j \end{cases} \quad (10)$$

One skilled in the art will appreciate that other initial similarity values may be given, for example, based on a previously calculated cosine similarity. The normalization factors $\lambda_o$ and $\lambda_f$ may be selected to minimize the norm of $L_o$ and $L_f$ after convergence. The factors $\lambda_o$ and $\lambda_f$ can be selected by solving the following minimization equations:

$$\lambda_o = \mathrm{argmin} \| I - \lambda_o \mathrm{diag}(B^T S_f B) \| \quad (11)$$

$$o \leq \lambda_o < \frac{1}{\|B\|}$$

$$\lambda_f = \mathrm{argmin} \| I - \lambda_f \mathrm{diag}(B S_o B^T) \| \quad (12)$$

$$o \leq \lambda_f < \frac{1}{\|B\|}$$

Thus, $\lambda_o$ and $\lambda_f$ should be as large as possible under the constraint of being less than $$\frac{1}{\|B\|}.$$

Figure 1:
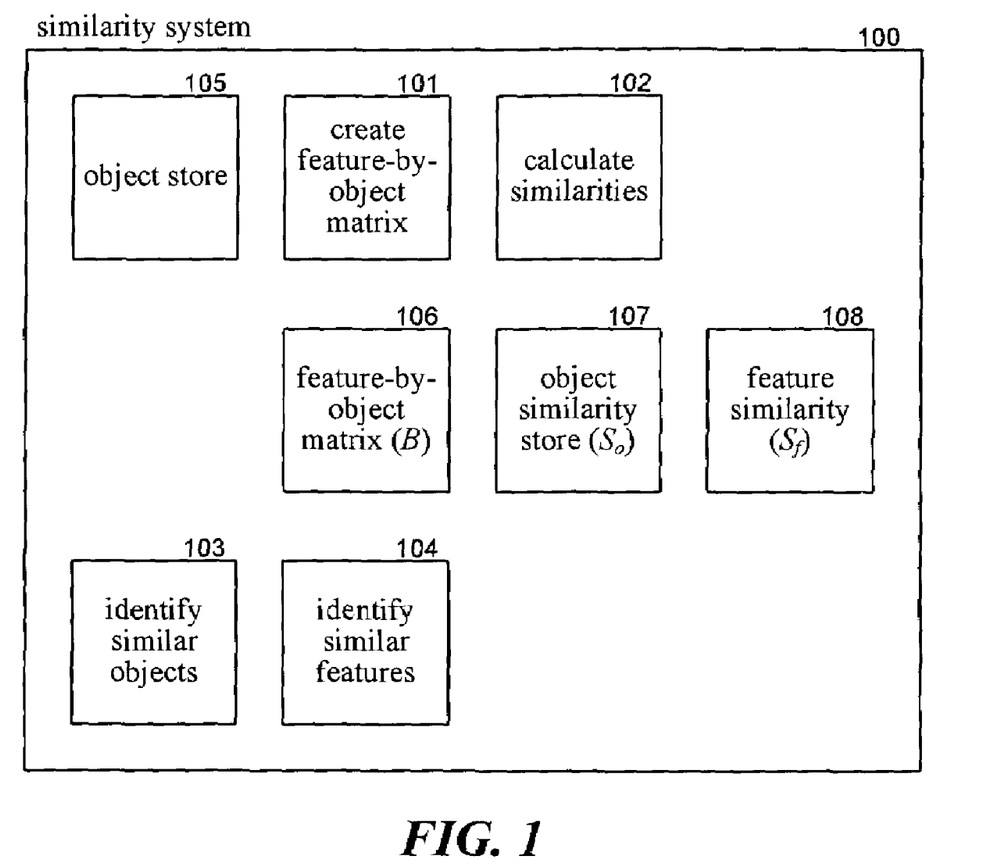
FIG. 1 is a block diagram that illustrates components of the similarity system in one embodiment.

FIG. 1 is a block diagram that illustrates components of the similarity system in one embodiment. The similarity system 100 includes components 101-104 and data stores 105-108. The create feature-by-object matrix component 101 generates the feature-by-object matrix based on the objects and features of the object store 105 and stores the generated matrix in the feature-by-object matrix store 106. The calculate similarity component 102 calculates the similarity between objects and between features based on the data of the feature-by-object matrix store 106 and stores object similarity scores in the object similarity store 107 and feature similarity scores in the feature similarity store 108. After the similarity scores are calculated, the similarity system may identify similar objects and features using the identify similar objects component 103 and the identify similar features component 104.

The computing device on which the similarity system is implemented may include a central processing unit, memory, input devices (e.g., keyboard and pointing devices), output devices (e.g., display devices), and storage devices (e.g., disk drives). The memory and storage devices are computer-readable media that may contain instructions that implement the similarity system. In addition, data structures and message structures may be stored or transmitted via a data transmission medium, such as a signal on a communications link. Various communications links may be used, such as the Internet, a local area network, a wide area network, or a point-to-point dial-up connection.

The similarity system may be implemented in various operating environments including personal computers, server computers, hand-held or laptop devices, routers, switches, multiprocessor systems, microprocessor-based systems, programmable consumer electronics, network PCs, minicomputers, mainframe computers, distributed computing environments that include any of the above systems or devices, and the like.

The similarity system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
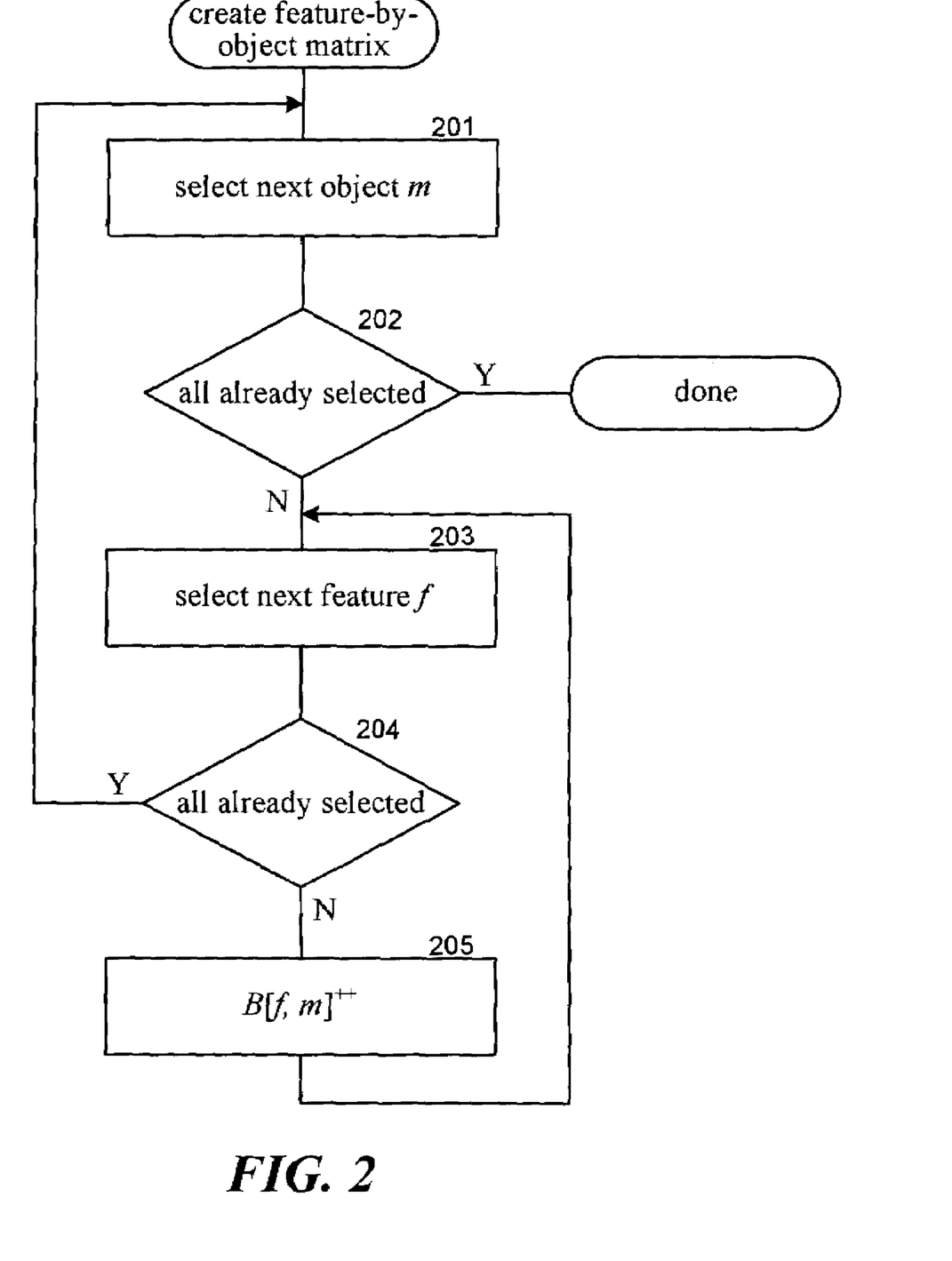
FIG. 2 is a flow diagram that illustrates the processing of the create feature-by-object matrix component in one embodiment.

FIG. 2 is a flow diagram that illustrates the processing of the create feature-by-object matrix component in one embodiment. The component processes the objects of the object store and stores a mapping of the objects to their features in the feature-by-object matrix store. For example, the component may compare the words of a document to a list of keywords and set the values of a keyword vector to 0 or 1 depending on whether the document contains that keyword. In blocks 201-205, the component loops selecting each object and each feature within each object. In block 201, the component selects the next object of the object store. In decision block 202, if all the objects have already been selected, then the component completes, else the component continues at block 203. In block 203, the component selects the next feature of the selected object. In decision block 204, if all the features of the selected object have already been selected, then the component loops to block 201 to select the next object, else the component continues at block 205. In block 205, the component increments the number of times the selected feature occurs in the selected object and then loops to block 203 to select the next feature. One skilled in the art will appreciate that values for the feature-by-object matrix may be defined in various ways. For example, the values may be Boolean values indicating whether or not the object has that feature irrespective of the number of times it may have it. Alternatively, the values may be a count of the number of times the feature occurs in the object as illustrated by this embodiment of the component. In addition, the count may be a decaying count that decreases (e.g., exponentially) as a number of occurrences increases. For example, a feature that occurs 50 times in an object may have a value of 10, whereas a feature that occurs 100 times in an object may only have a value of 15.

Figure 3:
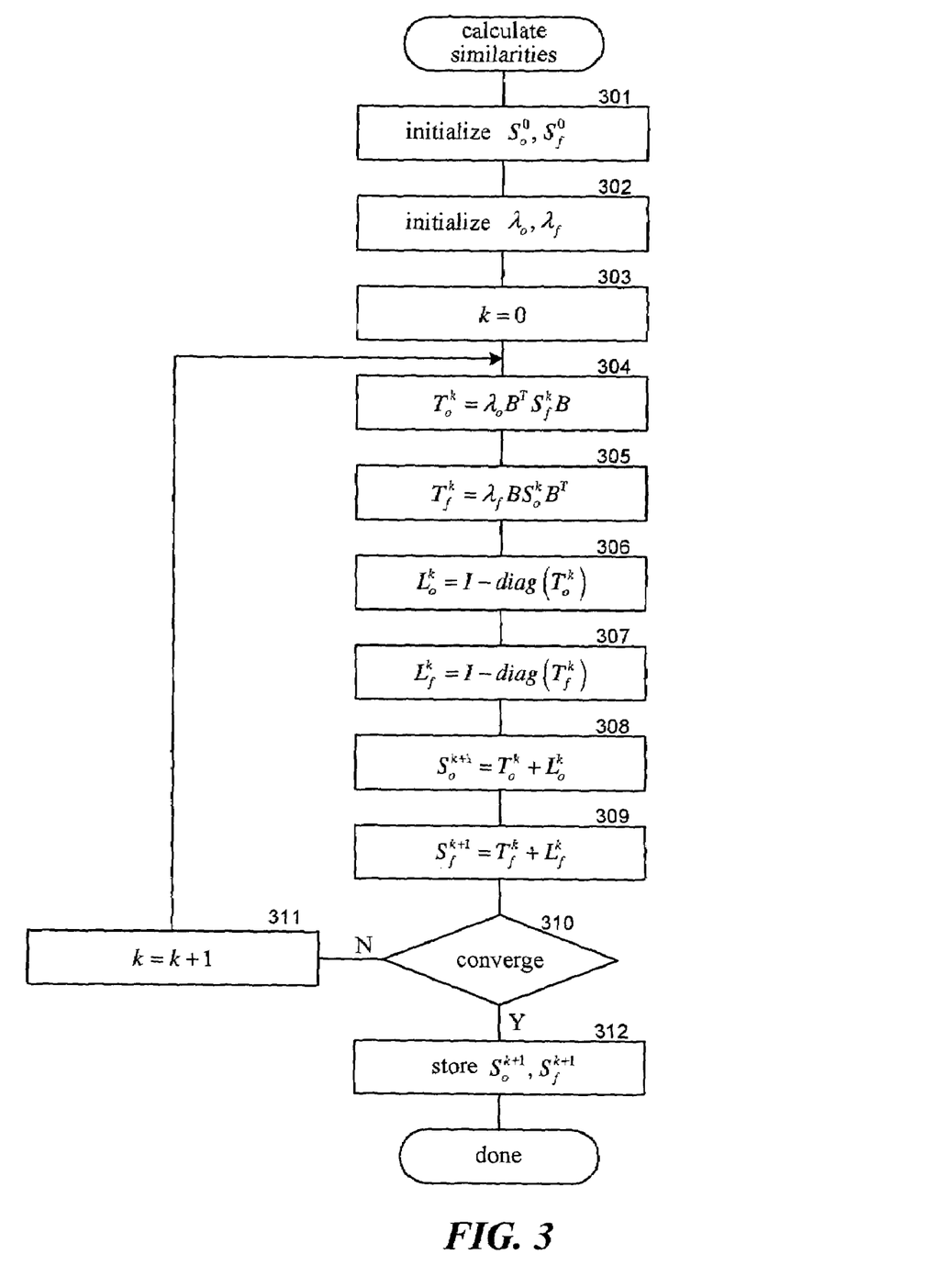
FIG. 3 is a flow diagram that illustrates the processing of the calculate similarities component in one embodiment.

FIG. 3 is a flow diagram that illustrates the processing of the calculate similarities component in one embodiment. In block 301, the component initializes the similarity matrices for the objects and features, for example, by setting the diagonal values to 1 and all the other values to 0, indicating that an item has maximum similarity to itself and maximum dissimilarity to other items according to Equations 9 and 10. In block 302, the component initializes the normalization parameters for the objects and features. In blocks 303-311, the component loops performing the iterations of the similarity algorithm. In block 303, the component sets the index k of the previous iteration to 0. In block 304, the component calculates initial similarity scores for the objects for the current iteration (i.e., k+1) according to Equation 3. In block 305, the component calculates initial similarity scores for the features for the current iteration according to Equation 4. In block 306, the component calculates the diagonal adjustments to the similarity scores for the objects for the current iteration according to Equation 7. In block 307, the component calculates the diagonal adjustments for the similar scores for the features for the current iteration according to Equation 8. In block 308, the component combines the initial similarity scores and the diagonal adjustments similarity scores to give the similarity score for the objects for the current iteration. In block 309, the component combines the initial similarity scores and the diagonal adjustments to give the similar score for the features for the current iteration. In decision block 310, if the similarity scores converge on the solution, then the component continues at block 312, else the component continues at block 311. The similarity scores may converge, for example, when the root mean square of the difference between the similarity scores of the current and the previous iterations is less than a threshold amount. In block 311, the component increments to the next iteration and then loops to block 304 to recalculate the similarity scores. In block 312, the component stores the similarity scores for the objects and the features in the object similarity store and the feature similarity store and then completes.

Figure 4:
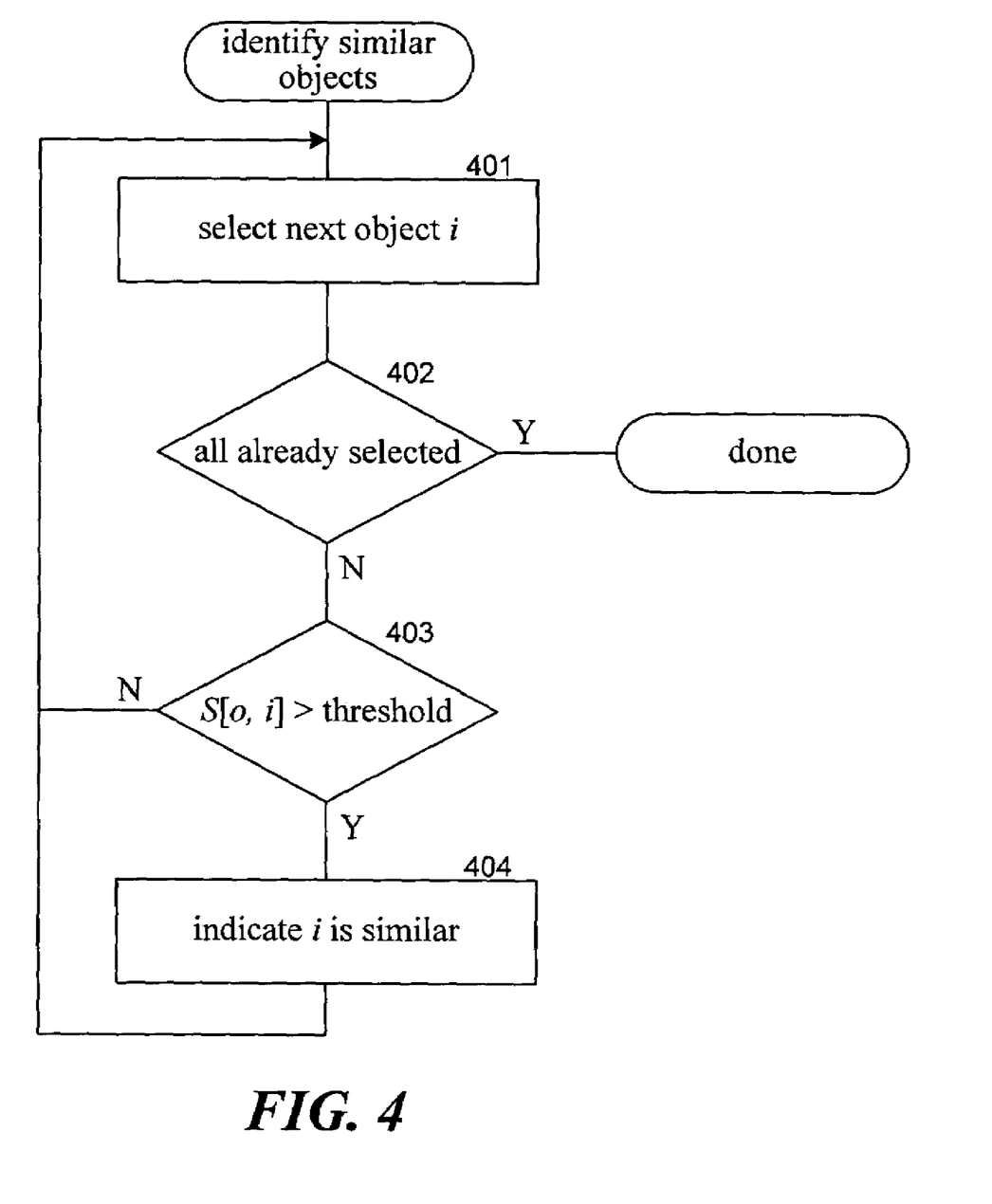
FIG. 4 is a flow diagram that illustrates the processing of the identify similar objects component in one embodiment.

FIG. 4 is a flow diagram that illustrates the processing of the identify similar objects component in one embodiment. The component is passed an indication of an object and identifies those objects that are similar using the information of the object similarity store. Although not shown, the identify similar features component works in an analogous manner. In blocks 401-404, the component loops checking the similarity score of each object to the passed object. One skilled in the art will appreciate that similarity scores between one object and the other objects may be ordered from high to low so that objects highly similar to that one object are first in its list. In block 401, the component selects the next object. In decision block 402, if all the objects have already been selected, then the component completes, else the component continues at block 403. In decision block 403, if the similarity between the passed object and the selected object is greater than a threshold similarity, then the component continues at block 404, else the component loops to block 401 to select the next object. In block 404, the component indicates that the selected object is similar to the passed object and loops to block 401 to select the next object.

One skilled in the art will appreciate that although specific embodiments of the similarity system have been described herein for purposes of illustration, various modifications may be made without deviating from the spirit and scope of the invention. Accordingly, the invention is not limited except by the appended claims.

We claim:

1. A method in a computer system with a processor for determining similarity between objects and between features of the objects, the method comprising:

providing a mapping from objects to their features;

initializing by the processor a similarity score for each pair of objects and each pair of features;

for each of multiple iterations, setting by the processor the similarity scores for each pair of objects based on the similarity scores of the pairs of features set during the previous iteration and the mapping from objects to their features; and setting by the processor the similarity scores for each pair of features based on the similarity scores of the pair of objects set during the previous iteration and the mapping from objects to their features;

receiving an indication of an object; and
for each of a plurality of pair objects that includes the indicated object,
  retrieving by the processor the similarity score for that pair of objects; and
  when the retrieved similarity score satisfies a threshold similarity, indicating by the processor the objects of the pair of objects are similar
wherein the setting of similarity scores is based on the following equations:

$$S_o^{k+1} = \lambda_o B^T S_f^k B + L_o^k$$

and $$S_f^{k+1} = \lambda_f B S_o^k B^T + L_f^k$$

where $S_o^k$ is a matrix of similarity scores for the objects for iteration k, $S_f^k$ is a matrix of similarity scores for the features for iteration k, B is a matrix of the features of the objects, $\lambda_o$ is a normalization factor for the similarity scores of the objects, $\lambda_f$ is a normalization factor for the similarity scores of the features, and $L_o^k$ and $L_f^k$ are represented by the following equations:

$$L_o^k = I - \text{diag}(\lambda_o B^T S_f^k B)$$

and $$L_f^k = I - \text{diag}(\lambda_f B S_o^k B^T).$$

2. The method of claim 1 wherein the iterations are performed until the similarity scores converge on a solution.

3. The method of claim 1 wherein the objects are documents and the features are words within the documents.

4. The method of claim 1 wherein the objects are queries and the features are words within the queries.

5. The method of claim 1 including, when setting the similarity scores, adjusting the similarity scores so that a similarity score between an object and itself is a maximum similarity score.

6. The method of claim 1 including, when setting the similarity scores, adjusting the similarity scores so that a similarity score between a feature and itself is a maximum similarity score.

7. The method of claim 1 wherein the setting of the similarity scores includes normalizing the similarity scores.

8. The method of claim 1 wherein the initializing of similarity scores sets the similarity score of an object to itself to a maximum similarity score and an object to another object to a minimum similarity score.

9. The method of claim 1 wherein the initializing of similarity scores sets the similarity score of a feature to itself to a maximum similarity score and a feature to another feature to a minimum similarity score.

10. The method of claim 1 wherein $\lambda_o$ and $\lambda_f$ are between zero and one over the length of matrix B.

11. The method of claim 10 wherein $\lambda_o$ and $\lambda_f$ are selected to be as large as possible.

12. The method of claim 1 wherein $\lambda_o$ and $\lambda_f$ are represented by the following equations:

$$\lambda_o = \text{argmin} \| I - \lambda_o \text{diag}(B^T S_f B) \|$$

$$o \leq \lambda_o < \frac{1}{\|B\|}$$

and $$\lambda_f = \text{argmin} \| I - \lambda_f \text{diag}(B S_o B^T) \|$$

$$o \leq \lambda_f < \frac{1}{\|B\|}.$$

13. A computer-readable storage medium having instructions for controlling a computer system to determine similarity between objects and features of the objects, by a method comprising:
  setting the similarity scores for pairs of objects based on similarity scores of pairs of features previously set and a mapping from objects to their features;
  setting the similarity scores for pairs of features based on the similarity scores of pairs of objects previously set and the mapping from objects to their features;
  receiving an indication of an object; and
  for a pair objects that includes the indicated object, retrieving the similarity score for that pair of objects; and
    when the retrieved similarity score is greater than a threshold similarity, indicating that the objects of the pair of objects are similar,
wherein the settings are iteratively performed until a solution is reached
wherein the setting of similarity scores is based on the following equations:

$$S_o^{k+1} = \lambda_o B S_f^k B^T$$

and $$S_f^{k+1} = \lambda_f B^T S_o^k B$$

where $S_o^k$ is a matrix of similarity scores for the objects for iteration k, $S_f^k$ is a matrix of similarity scores for the features for iteration k, B is a matrix of the features of the objects, $\lambda_o$ is a normalization factor for the similarity scores of the objects, and $\lambda_f$ is a normalization factor for the similarity scores of the features.

14. The computer-readable storage medium of claim 13 wherein a solution is reached based on a difference between the similarity scores of iterations.

15. The computer-readable storage medium of claim 13 wherein a solution is reached after a predefined number of iterations.

16. The computer-readable storage medium of claim 13 wherein the objects are documents and the features are words within the documents.

17. The computer-readable storage medium of claim 13 wherein the objects are queries and the features are words within the queries.

18. The computer-readable storage medium of claim 13 including when setting the similarity scores, adjusting the similarity scores so that a similarity score between an object and itself is a maximum similarity score.

19. The computer-readable storage medium of claim 13 including when setting the similarity scores, adjusting the similarity scores so that a similarity score between a feature and itself is a maximum similarity score.

20. The computer-readable storage medium of claim 13 including, when setting the similarity scores, normalizing the similarity scores.

21. The computer-readable storage medium of claim 13 including initializing the similarity score of an object to itself to a maximum similarity score and an object to another object to a minimum similarity score.

22. The computer-readable storage medium of claim 13 including initializing the similarity score of a feature to itself to a maximum similarity score and a feature to another feature to a minimum similarity score.

23. The computer-readable storage medium of claim 13 wherein $\lambda_o$ and $\lambda_f$ are between zero and one over the length of matrix B.

24. The computer-readable storage medium of claim 13 wherein $\lambda_o$ and $\lambda_f$ are selected to be as large as possible.

* * * * *